US008977131B2

(12) United States Patent
Yoshida et al.

(10) Patent No.: US 8,977,131 B2
(45) Date of Patent: Mar. 10, 2015

(54) OPTICAL APPARATUS AND USE METHOD THEREOF FOR PASSIVE OPTICAL NETWORK SYSTEM

(75) Inventors: Setsuo Yoshida, Kawasaki (JP); Susumu Kinoshita, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 322 days.

(21) Appl. No.: 12/372,203

(22) Filed: Feb. 17, 2009

(65) Prior Publication Data

US 2009/0208227 A1 Aug. 20, 2009

(30) Foreign Application Priority Data

Feb. 19, 2008 (JP) .................................. 2008-037889

(51) Int. Cl.
*H04J 14/08* (2006.01)
*H04J 14/00* (2006.01)
*H04B 10/27* (2013.01)
*H04B 10/293* (2013.01)
*H04J 14/02* (2006.01)

(52) U.S. Cl.
CPC ............ *H04B 10/27* (2013.01); *H04B 10/2939* (2013.01); *H04J 14/0282* (2013.01)
USPC .................................. 398/98; 398/99; 398/52

(58) Field of Classification Search
CPC .. H04B 10/27; H04B 10/2939; H04J 14/0282
USPC .................................. 398/98, 202, 75, 177, 45
See application file for complete search history.

(56) References Cited

U.S. PATENT DOCUMENTS

| 6,404,525 | B1 * | 6/2002 | Shimomura et al. ............ 398/82 |
|---|---|---|---|
| 6,724,526 | B1 * | 4/2004 | Onaka et al. ................ 359/337.1 |
| 7,061,666 | B2 * | 6/2006 | Inagaki et al. ............. 359/337.4 |
| 7,149,432 | B1 * | 12/2006 | Smith et al. .................... 398/158 |
| 7,295,775 | B2 * | 11/2007 | Bisson et al. .................... 398/33 |
| 7,672,585 | B2 * | 3/2010 | Sone et al. ....................... 398/45 |
| 2001/0005459 | A1 * | 6/2001 | Okawa et al. .................. 399/81 |
| 2001/0050805 | A1 * | 12/2001 | Ohshima et al. ........... 359/341.3 |
| 2002/0060837 | A1 * | 5/2002 | Inagaki et al. ................ 359/337 |
| 2002/0191904 | A1 * | 12/2002 | Kani et al. ...................... 385/24 |

(Continued)

FOREIGN PATENT DOCUMENTS

JP 10-93511 4/1998
JP 2002-57627 2/2002

OTHER PUBLICATIONS

Motojima, "A Prospect of the Future Optical Network", IEEJ Journal, vol. 126, No. 2, pp. 92-96, 2006; 2.2 10G-PON optical interferce technology, p. 94 col. 1, line 20-col. 2, line 19, and Fig. 8.

(Continued)

*Primary Examiner* — Ken Vanderpuye
*Assistant Examiner* — Amritbir Sandhu
(74) *Attorney, Agent, or Firm* — Staas & Halsey LLP

(57) ABSTRACT

An optical apparatus receives an upward signal light from a plurality of subscriber units, where the upward signal light is composed of a plurality of time slots corresponding to the plurality of optical subscriber units. The optical apparatus includes a driving unit configured to determine a respective required gain for light from each of the plurality of optical subscriber units, an amplifying section configured to amplify the upward signal light with the required gain corresponding to the time slots of the upward signal light, and a receiver configured to receive the amplified upward signal light.

14 Claims, 9 Drawing Sheets

(56) References Cited

U.S. PATENT DOCUMENTS

| | | | |
|---|---|---|---|
| 2004/0036958 A1* | 2/2004 | Sugaya et al. | 359/341.3 |
| 2004/0247246 A1* | 12/2004 | Lee et al. | 385/48 |
| 2005/0046927 A1* | 3/2005 | Sugaya et al. | 359/337 |
| 2005/0260001 A1* | 11/2005 | Sakamoto | 398/202 |
| 2006/0023298 A1* | 2/2006 | Ohshima et al. | 359/349 |
| 2006/0198017 A1* | 9/2006 | Inagaki et al. | 359/337 |
| 2007/0223921 A1* | 9/2007 | Sone et al. | 398/45 |
| 2008/0056720 A1* | 3/2008 | Sitton et al. | 398/98 |
| 2008/0285976 A1* | 11/2008 | Izumi | 398/98 |
| 2008/0298807 A1* | 12/2008 | Yang et al. | 398/98 |
| 2008/0309407 A1* | 12/2008 | Nakamura et al. | 330/253 |
| 2009/0285581 A1* | 11/2009 | Kim et al. | 398/140 |
| 2014/0139909 A1* | 5/2014 | Kinoshita et al. | 359/341.33 |

OTHER PUBLICATIONS

Japanese Office Action issued Nov. 15, 2011 in corresponding Japanese Patent Application No. 2008-037889.

* cited by examiner

OPTICAL APPARATUS AND USE METHOD THEREOF FOR PASSIVE OPTICAL NETWORK SYSTEM

CROSS-REFERENCE TO RELATED APPLICATIONS

This application is based upon and claims the benefit of priority of the prior Japanese Patent Application No. 2008-037889, filed on Feb. 19, 2008, the entire contents of which are incorporated herein by reference.

BACKGROUND

1. Field

The present invention relates to an optical apparatus that is suitable for a passive optical network (PON) system and may be applied to a control of power of upward signal lights from a plurality of optical network units (ONU) to an optical line terminal (OLT).

2. Description of the Related Art

A passive optical network (PON) system is known as an optical fiber network system suitable for ordinary households' subscribers. FIG. 7 is a diagram illustrating a configuration of a PON system. In the PON system of FIG. 7, a signal light is transmitted to an optical transmission line 130 from an optical line terminal (OLT) 110, which is provided in a central station, and the signal light is branched into signal lights by an optical coupler 140. Optical network units (ONU) 120-1, 120-2, and 120-3, which are installed in subscriber's homes, are connected to the optical coupler 140 via lines.

The OLT 110 is an apparatus that transmits a downward signal light and distributes information to each of the ONUs 120. The OLT 110 also receives upward signal lights from the respective ONUs 120. Each of the ONU 120 is an apparatus that performs communication control, such as communication with the OLT 110, and conversion between a signal light and an electric signal. Here, the respective upward and downward signal light are bidirectionally transmitted using different wavelength via the one optical transmission line 130, between the OLT 110 and the optical coupler 140.

The downward signal light from the OLT 110 to each of the ONUs 120 is transmitted using time division multiplexing (TDM) as a signal light in a continuous mode. The ONU 120 detects frame synchronization information and management information that are included in the downward signal light. On the basis of the frame synchronization information and management information, the ONU 120 retrieves data in one of the time slots that are assigned to the respective ONUs 120. The time slot corresponding to the respective ONU 120 is assigned in advance.

The upward signal lights transmitted from the respective ONUs 120 to the OLT 110 are transmitted as signal lights in a burst mode in accordance with predetermined timings. The timings are provided from the OLT 110 to the respective ONUs 120 so that the upward signal lights do not collide with one another.

FIG. 8 is a diagram illustrating a configuration of a PON system in which a relay amplifier is disposed. As illustrated in FIG. 8, in order to transfer a signal light over a longer distance, a relay amplifier 150 is provided on the optical transmission line 130 between the OLT 110 and the optical coupler 140. In the relay amplifier 150, upward and downward signal light, which are bidirectionally transmitted, are separated from each other by WDM couplers 151 and 152. Loss of the upward and downward signal lights caused by optical transmission losses are compensated by optical amplifiers 153 and 154, respectively.

FIG. 9 is a diagram illustrating a configuration of an OLT in which a pre-amplifier for upward signal light is disposed. As illustrated in FIG. 9, in the OLT 110, a transmitter 111 outputs a downward signal light with a higher power. Upward signal lights from a WDM coupler 113 is amplified by a pre-amplifier 114 and optical transmission losses are compensated. After unnecessary noise light is removed by an optical filter 115 in upward signal lights, a receiver 112 receives the upward signal lights. Configurations illustrated in FIG. 9 are discussed in "Technology Search: Future Prospects for Optical Network", Kuniaki Motoshima, Journal of the Institute of Electrical Engineers, 2006, Volume 126 Number 2, P. 92-96), for example.

In the above-described PON system that supports a longer distance, illustrated in FIG. 8 or 9, with respect to upward signal lights, while levels of the upward signal lights as a whole are compensated by the relay amplifier 150 or the pre-amplifier 114 in the OLT 110, a deviation $\Delta P$ of optical power values P1, P2, P3, . . . of signal lights corresponding to the time slots, is not compensated and remains. The deviation $\Delta P$ is caused by a variation in losses that occur between the respective ONUs 120 and the optical coupler 140, as illustrated in FIGS. 8 and 9.

In a PON system supporting high-speed optical communication, for example, in which a bit rate of signal light is equal to or higher than 10 Gbps, as a dynamic range of a receiver in an OLT is narrow, the deviation $\Delta P$ of optical power values of upward signal lights degrades reception characteristics of the OLT.

SUMMARY

An optical apparatus receives an upward signal light from a plurality of subscriber units, where the upward signal light is composed of a plurality of time slots corresponding to the plurality of optical subscriber units. The optical apparatus includes a driving unit configured to determine a respective required gain for light from each of the plurality of optical subscriber units, an amplifying section configured to amplify the upward signal light with the respective required gain corresponding to the time slots of the upward signal light and a receiver configured to receive the amplified upward signal light.

In the optical apparatus, the amplifying section may include a branching unit configured to branch the upward signal light to a plurality of branched lights, a plurality of amplifying units configured to amplify the respective branched lights, where corresponding gain of the plurality of amplifying units are different from each other and a multiplexer configured to combine output lights from the plurality of amplifying units is provided, and the driving unit is configured to supply a drive current to the plurality of the amplifying units corresponding to the required gain for the time slots of the upward signal light.

The object and advantages of the invention will be realized and attained by means of the elements and combinations particularly pointed out in the claims. It is to be understood that both the foregoing general description and the following detailed description are exemplary and explanatory and are not restrictive of the invention, as claimed.

Additional aspects and/or advantages will be set forth in part in the description which follows and, in part, will be apparent from the description, or may be learned by practice of the invention.

BRIEF DESCRIPTION OF THE DRAWINGS

These and/or other aspects and advantages will become apparent and more readily appreciated from the following description of the embodiments, taken in conjunction with the accompanying drawings of which.

DETAILED DESCRIPTION OF EMBODIMENTS

Figure 1:
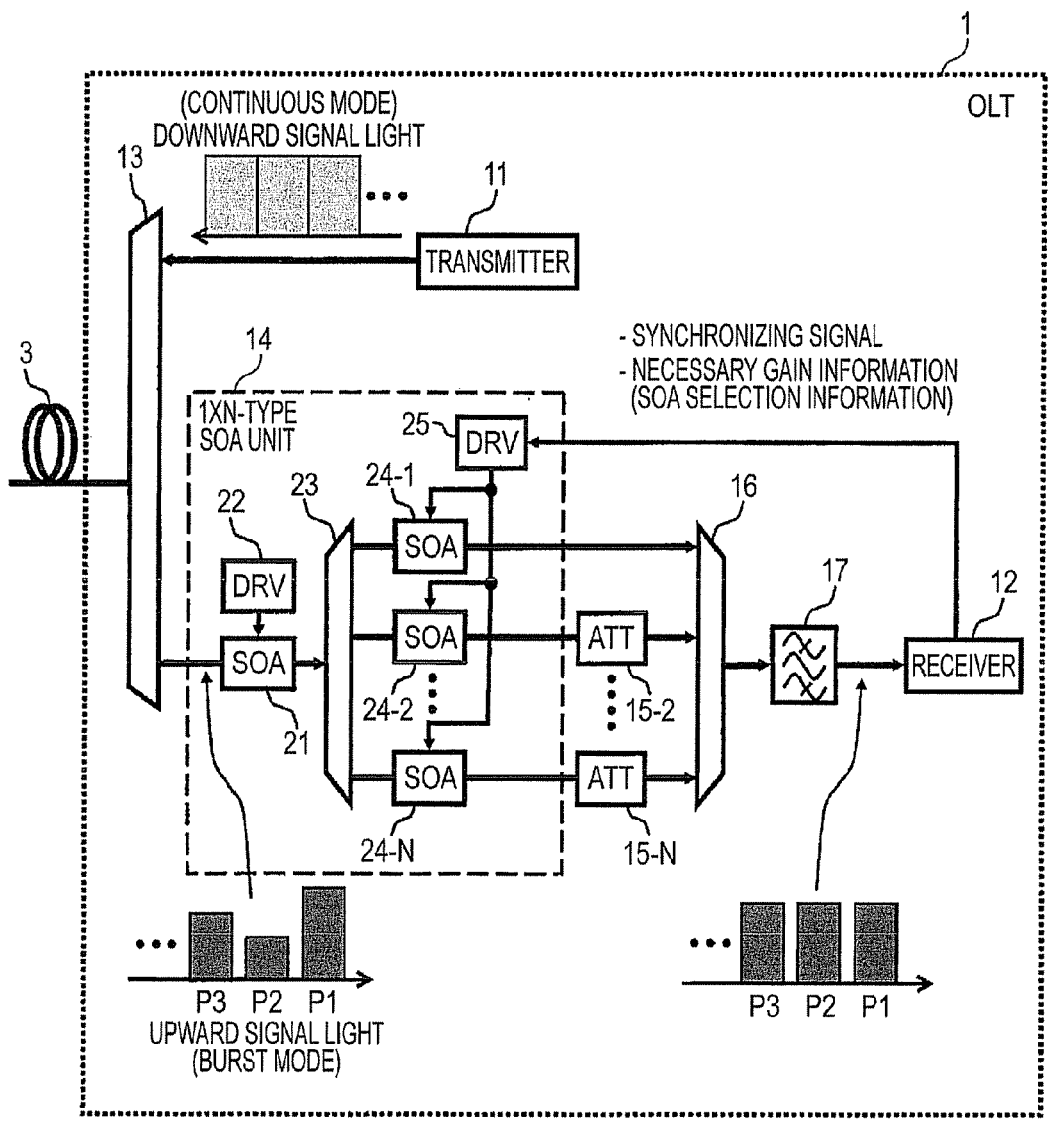
FIG. 1 is a diagram illustrating a configuration of an optical apparatus according to an embodiment.

Reference will now be made in detail to the embodiments, examples of which are illustrated in the accompanying drawings, wherein like reference numerals refer to the like elements throughout. The embodiments are described below to explain the present invention by referring to the figures.

Figure 2:
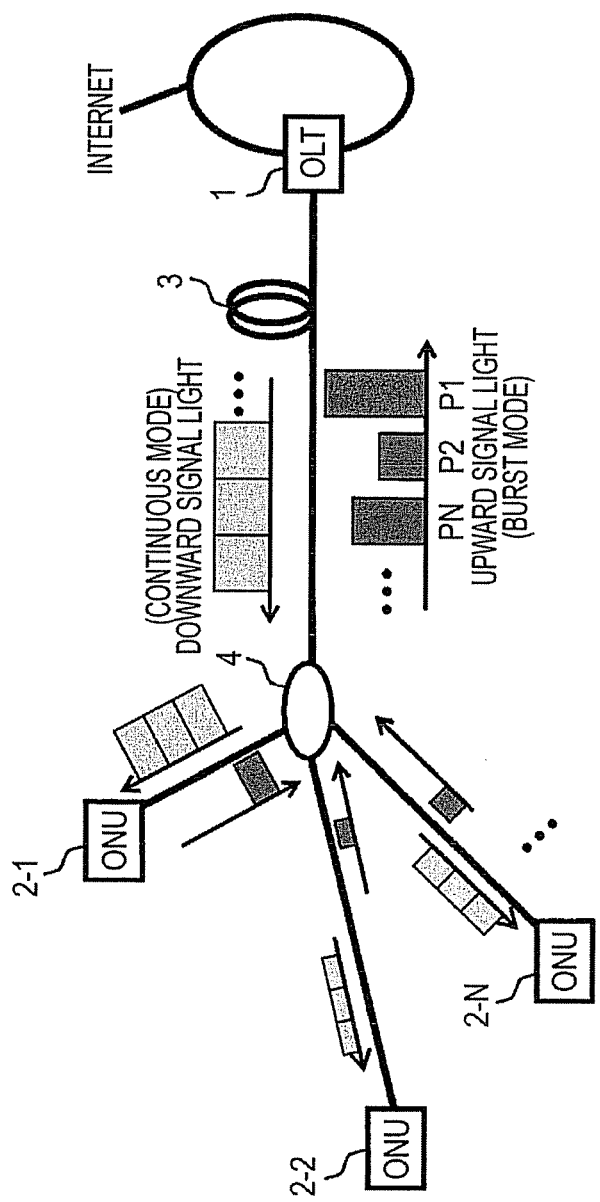
FIG. 2 is a diagram illustrating configuration of a Passive Optical Network (PON) system in which an Optical Line Terminal (OLT) illustrated in FIG. 1 is used.

FIG. 1 is a diagram illustrating a configuration of an optical apparatus according to an embodiment. FIG. 2 is a diagram illustrating a configuration of a PON system in which the optical apparatus illustrated in FIG. 1 is used.

Referring to FIGS. 1 and 2, the optical apparatus is used as an OLT 1 of the PON system. The OLT 1 generates a downward signal light, which is to be transmitted to a plurality of ONUs 2-1, 2-2, 2-3, . . . , and 2-N on the PON system, in a continuous mode by using a transmitter 11, and outputs the downward signal light to an optical transmission line 3 via a WDM coupler 13.

Figure 3:
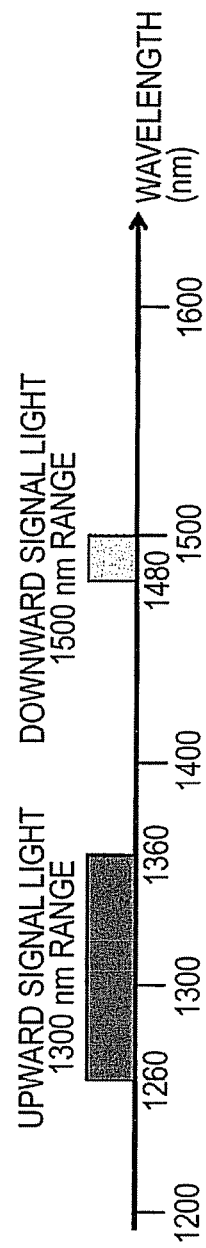
FIG. 3 is a diagram illustrating an arrangement of wavelengths of upward signal lights and downward signal light.

FIG. 3 is a diagram illustrating an arrangement of wavelengths of upward signal lights and downward signal light. As illustrated in FIG. 3, a 1500 nm band is assigned to a wavelength band of the downward signal light. The upward signal lights are transmitted from the respective ONUs 2-1, 2-2, 2-3, . . . , and 2-N, and are combined into an upward signal light by an optical coupler 4 (FIG. 2). The upward signal light is transmitted on the optical transmission line 3 in a burst mode. The upward signal light is input, for example, to a 1×N-type semiconductor optical amplifier (SOA) unit 14 via the WDM coupler 13 in the OLT 1. As illustrated in FIG. 3, a 1300 nm band that is different from the band of downward signal light is assigned to a wavelength band of upward signal light.

In the embodiment above, different wavelength bands are assigned to the respective bands of upward and downward signal light. However, the same wavelength may be assigned to upward and downward signal light, and upward signal light and downward signal light may be transmitted/received using time division. In the case, an optical coupler having no wavelength selectivity can be used instead of the WDM coupler 13.

In FIG. 1, the 1×N-type SOA unit 14 includes one SOA 21 to which the upward signal light that is output from the WDM coupler 13 is input, a driver circuit (DRV) 22 of the SOA 21, a branching unit 23 that branches light which is output from the SOA 21 into N branches (where N is an integer that is equal to or more than two), and N SOAs 24-1, 24-2, . . . , and 24-N which are connected to respective output ports of the branching unit 23, and a driver circuit (DRV) 25 of the N SOAs.

The SOA 21 on the input side amplifies the upward signal light with a gain with which a loss caused by the branching unit 23 can be at least compensated, and increases levels of signal lights which are to be input to the SOAs 24-1 to 24-N on the output side via the branching unit 23, whereby degradation in optical signal-to-noise ratios (OSNRs) of the respective signal lights can be avoided. Note that the SOA 21 and the driver circuit 22 on the input side are not components necessary in the embodiment, and can be omitted in accordance with the performance of a receiver 12 or other components. As the SOAs 24-1 to 24-N on the output side are same components and each of the SOAs 24-1 to 24-N is driven by a drive current that is supplied from the driver circuit 25, the SOAs 24-1 to 24-N have substantially the same gain. In accordance with a synchronizing signal and a required gain information from the receiver 12, the driver circuit 25 supplies the drive current to one of the SOAs 24-1 to 24-N and do not supply the drive current to other SOAs. By the configuration, the SOAs 24-1 to 24-N perform gain switching operation at a high speed. By the configuration of the SOAs, the 1×N-type SOA unit 14 operates as a high-speed gate switch at a speed of the order of nanoseconds, and provides a predetermined gain for signal light that has passed the gate of the 1×N-type SOA unit 14.

Optical attenuators (ATTs) 15-2 to 15-N are connected to respective output ports of the SOAs 24-2 to 24-N. Of the SOAs 24-1 to 24-N in the 1×N-type SOA unit 14, only the SOA 24-1 is not connected to an optical attenuator. The ATTs 15-2 to 15-N have different attenuations from one another. For example, the attenuations of the respective ATTs 15-2 to 15-N are set to increase in steps (increments) by approximately one to two dB. Output lights from the SOA 24-1 and the ATTs 15-2 to 15-N are supplied to input ports of a multiplexer 16 respectively, combined together, and input to an optical filter 17. After noise light that is generated in the 1×N-type SOA unit 14 is removed from the signal light in the filter 17, the signal light is transmitted to the receiver 12.

The receiver 12 receives the signal light from the optical filter 17 and outputs data from the ONUs 2-1, 2-2, 2-3, . . . , and 2-N. The receiver 12 has a data table related to a time slot information and required gain information, both corresponding to the upward signal lights from ONUs 2-1 to 2-N. The time slot information is concerning time slots in which respective frames of the upward signal lights that were transmitted from the ONUs 2-1, 2-2, 2-3, . . . , and 2-N are to reach the 1×N-type SOA unit 14. The required gain information is concerning amounts of required gain in order to receive signal lights which were transmitted from the respective ONUs 2-1, 2-2, 2-3, . . . , and 2-N. The table is registered in a memory (not illustrated).

Configurations of the respective ONUs 2-1, 2-2, 2-3, . . . , and 2-N, the optical transmission line 3, and the optical coupler 4 in the PON system illustrated in FIG. 2 may be similar to those in a known PON system.

Figure 4:
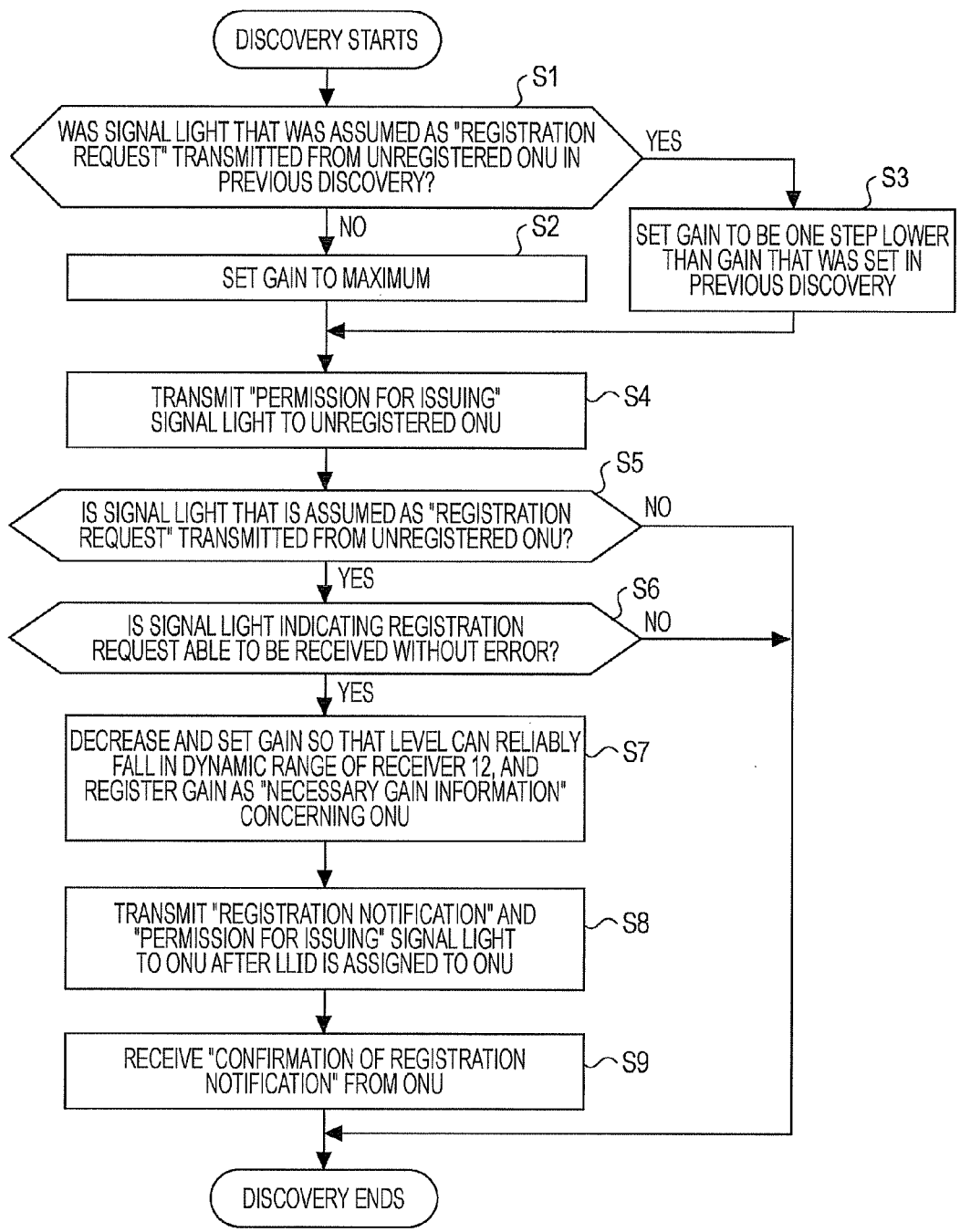
FIG. 4 is a flow chart illustrating a process of registering required gain information in the OLT illustrated in FIG. 1.

FIG. 4 is a flow chart illustrating a process of registering required gain information, for example, in the OLT illustrated in FIG. 1. In the OLT 1 illustrated in FIG. 1, first, required gain information is registered using a discovery sequence. The discovery sequence is periodically performed in a PON system. When an ONU is newly added to a PON system, OLT automatically finds the newly added ONU and registers required gain information by the discovery sequence.

The discovery process is executed at predetermined periods in the OLT 1. In operation S1 in FIG. 4, when the discovery process starts, it is determined whether or not an upward signal light that was assumed as a "registration request" was transmitted from an unregistered ONU in the previous discovery process to the OLT 1.

When no "registration request" was transmitted from an unregistered ONU in the previous discovery process, an instruction of selecting SOAs 24-1 and turning off SOAs 24-2 to 24-N is provided to the driver circuit 25 in operation 2. The instruction is to select SOA 24-1 among the SOAs 24-1 to 24-N, with which a maximum gain can be obtained. The SOA 21 on the input side is always driven in a fixed state, regardless of the drive state of the SOAs 24-1 to 24-N on the output side.

When determining that the "registration request" was transmitted from an unregistered ONU in the previous discovery process, an instruction of selecting one of the combinations of SOAs and ATTs is provided to the driver circuit 25 in operation S3, in which a gain one step (increment) lower than in the previous discovery process is set.

After the gain is set in consideration of a result of the previous discovery process in operation S2 or S3, a downward signal light that indicates an instruction for "permission for issuing an upward signal light" is transmitted from the OLT 1 to the unregistered ONU. When the unregistered ONU receives the "permission for issuing upward signal light" from the OLT 1, the unregistered ONU transmits an upward signal light that indicates a "registration request".

Then, in operation S5, it is determined whether or not an upward signal light that is assumed as a "registration request" is transmitted from the unregistered ONU. When the upward signal light is transmitted, the process proceeds to operation S6.

In contrast, when the upward signal light is not transmitted, it is determined that no unregistered ONU exists, and the current discovery process ends.

In operation S6, it is determined, for example, at the receiver 12 in the OLT 1, whether or not the upward signal light that is assumed as a "registration request" is able to be received from the unregistered ONU substantially without error. When the upward signal light is able to be received, it is determined that the gain which is currently set using the combination of the 1×N-type SOA unit 14 and the ATTs 15-2 to 15-N is the maximum required gain in order to accurately receive the upward signal light from the unregistered ONU, and the process proceeds to the next operation, operation S7.

In contrast, when the upward signal light is not able to be received, the discovery process ends. It is also determined that: 1) although the unregistered ONU exists the gain that is set using the combination of the 1×N-type SOA unit 14 and the ATTs 15-2 to 15-N is too high; 2) the level of the signal light that is input to the receiver 12 falls outside of the dynamic band of the receiver 12; and 3) the receiver 12 is in a state in which it is not able to accurately receive the piece of the signal light that indicates a "registration request" from the unregistered ONU. In this case, in the next discovery process, the process proceeds from operation S1 to operation S3, which are described above, and a gain is set one step (increment) lower than the gain used in the previous discovery process, using the combination of the 1×N-type SOA unit 14 and the ATTs 15-2 to 15-N, and operations S4 to S6 are repeated.

In operation S7, considering that the gain which is currently set is the maximum gain, an instruction for setting a gain one further step or increments (or several steps) lower than the gain which is currently set, is provided to the driver circuit 25, using the combination of the 1×N-type SOA unit 14 and the ATTs 15-2 to 15-N, so that the input level of an upward signal light to the receiver 12 reliably falls in the dynamic range. The gain is registered in the memory of the receiver 12 or other components as required gain information corresponding to the unregistered ONU. The registered required gain information may be a value of a gain, or information concerning selection among SOAs, which specifies which SOA is to be selected and driven from among the SOAs 24-1 to 24-N on the output side of the 1×N-type SOA unit 14.

In operation S8, as same as in the case of the normal discovery process, after identification information (LLID) is assigned to the unregistered ONU, a downward signal light that indicates a "registration notification" is transmitted to the ONU and the ONU transmits a downward signal light that indicates "permission for issuing upward signal light". In the ONU that has received the "registration notification" and the "permission for issuing upward signal light" from the OLT 1, transmits an upward signal light that indicates a "confirmation of the registration notification" is transmitted. In operation S9, when the OLT 1 receives the "confirmation of the registration notification", and the discovery process ends.

With the process of registering required gain information by utilizing the discovery sequence, a table illustrated in Table 1, is stored in the memory of the receiver 12 of the OLT 1 or other components. In the table, the relationships among time slots for upward signal lights, ONUs that transmit the upward signal lights in the time slots, and required gain information (information concerning selection among SOAs) corresponding to the ONUs are summarized.

When required gain information concerning all of the ONUs that are connected to the PON system and the table illustrated in Table 1 is completed, the OLT 1 determines, in accordance with a synchronizing signal providing timings corresponding to the time slots for the upward signal lights, which ONU corresponds, as an ONU that transmitted an upward signal light, to the time slot for the upward signal light that is input to the 1×N-type SOA unit 14. The OLT 1 reads required gain information corresponding to the ONU from the table, and transmits the required gain information together with the synchronizing signal to the driver circuit 25. Thus, the SOAs 24-1 to 24-N are controlled so that an SOA corresponding to the required gain information is driven selectively from among the SOAs 24-1 to 24-N on the output side of the 1×N-type SOA unit 14 and the other SOAs are turned off.

With the above-described control of driving the SOAs 24-1 to 24-N on the output side on the basis of the synchronizing signal and required gain information, upward signal lights that are input to the 1×N-type SOA unit 14 pass the SOA 21 and the branching unit 23 on the input side. After that, each of the upward signal lights is amplified by a corresponding one of the SOAs 24 on the output side, which is switched in the corresponding time slots. When a corresponding one of the ATTs 15 is connected to the SOA 24 on the output side as the subsequent stage, the upward signal light is attenuated in accordance with the attenuation of the optical attenuator 15, and is transmitted to the multiplexer 16. After noise light is removed by the optical filter 17 from the upward signal lights that passed the multiplexer 16, the upward signal lights are input to the receiver 12.

Regarding values of optical power P1, P2, P3, . . . corresponding to the respective time slots for the pieces of the upward signal light that are input to the receiver 12, a deviation ΔP that is caused by a variation in losses that occur between the respective ONUs 2-1, 2-2, 2-3, and 2-N and the optical coupler 4 is compensated in accordance with gains that are set using the combination of the 1×N-type SOA unit 14 and the ATTs 15-2 to 15-N, and the input levels of the upward signal lights reliably fall in the dynamic band of the receiver 12.

As described above, the PON system is configured using the OLT 1 illustrated in FIG. 1, whereby, even when the bit rate of upward signal light is equal to or higher than 10 Gbps, data that was transmitted from the respective ONUs 2-1, 2-2, 2-3, . . . , and 2-N can be output by the receiver 12 that is provided in the OLT 1, regardless of a variation in losses that occur between the respective ONUs 2-1, 2-2, 2-3, . . . , and 2-N and the optical coupler 4.

Figure 5:
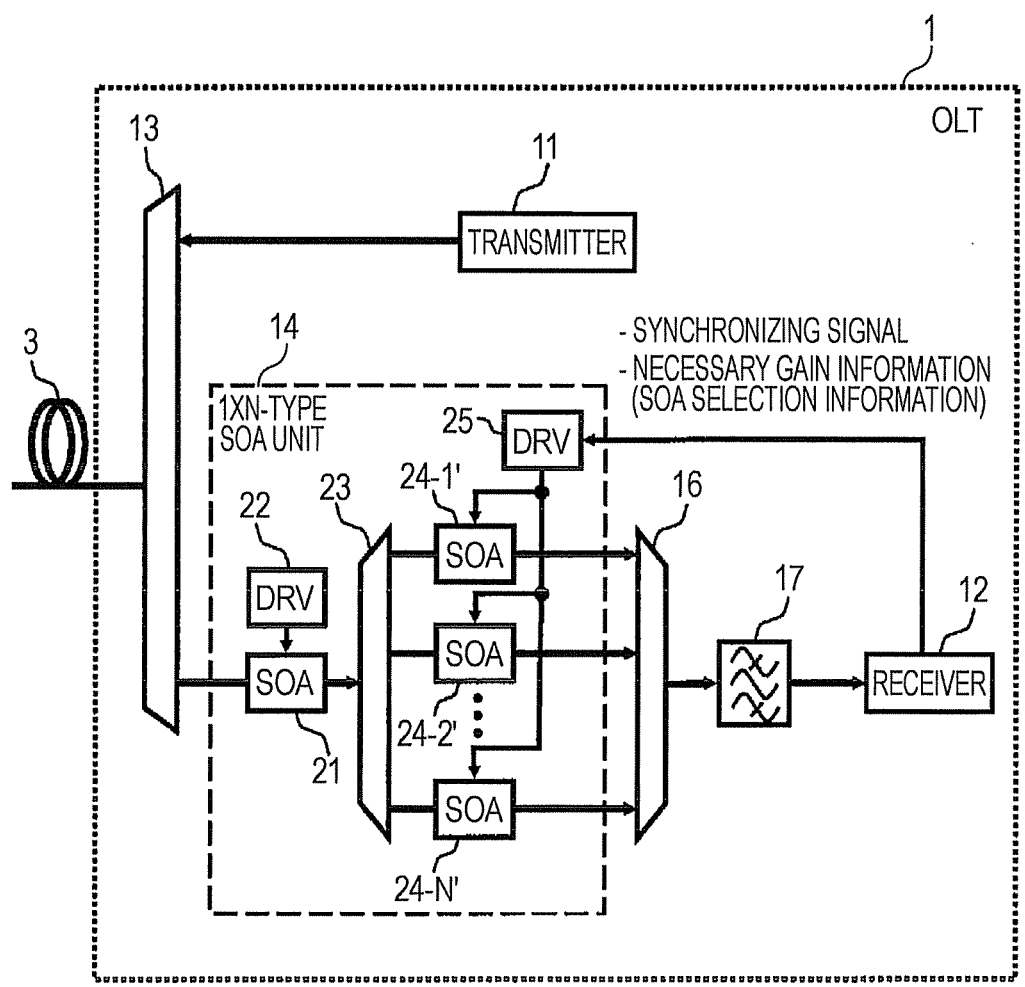
FIG. 5 is a diagram illustrating a configuration associated with the OLT illustrated in FIG. 1.

Note that, in the above-described embodiment, the ATTs 15-2 to 15-N having attenuations that are different from one another are connected to the SOAs 24-2 to 24-N on the output side of the 1×N-type SOA unit 14 so that the ATTs 15-2 to 15-N serve as the subsequent stages of the SOAs 24-2 to 24-N, thereby setting the gains in steps (increments) for the upward signal lights. However, for example, the respective SOAs on the output side of the 1×N-type SOA unit may be designed using designs that are different from one another, or drive currents that are to be supplied to the respective SOAs on the output side are set to be different from one another, thereby changing the gains of the respective SOAs on the output side in steps (increments), so that the ATTs 15-2 to 15-N can be omitted. An example of a configuration of the OLT 1 in this case is illustrated in FIG. 5. In this case, when SOAs on the output side are designed using a common design as in the case of the above-described embodiment, the 1×N-type SOA unit can be easily designed and manufactured.

Alternatively, because a general-purpose 1×N-type SOA unit can be utilized, such a configuration has a significant advantage. Furthermore, the range of the gain of an SOA that can be changed using a drive current is generally narrow. Thus, when a deviation of values of optical power corresponding to respective time slots for upward signal lights is comparatively large, the combination of SOAs and ATTs as described in the above embodiment is effective.

Furthermore, in the above-described embodiment, the attenuations of the ATTs 15-2 to 15-N are basically fixed. However, the attenuations of the respective ATTs 15-2 to 15-N can be changed to make a step width, which is used to set gains in steps (increments or stages), wider than before, at one time to adapt a wider range of optical power of upward signal. In this configuration, the OLT can receive an upward signal even when the level of a signal light that is input to the receiver 12 falls outside of the dynamic range of the receiver 12 under a condition that the minimum gain is set, using the combination of the 1×N-type SOA unit 14 and the ATTs 15-2 to 15-N in the above-described process of registering required gain information. In other words, the OLT can receive an upward signal even when an SOA whose output port is connected to an attenuator having the maximum attenuation is selected, and an error occurs in the receiver 12.

Figure 6:
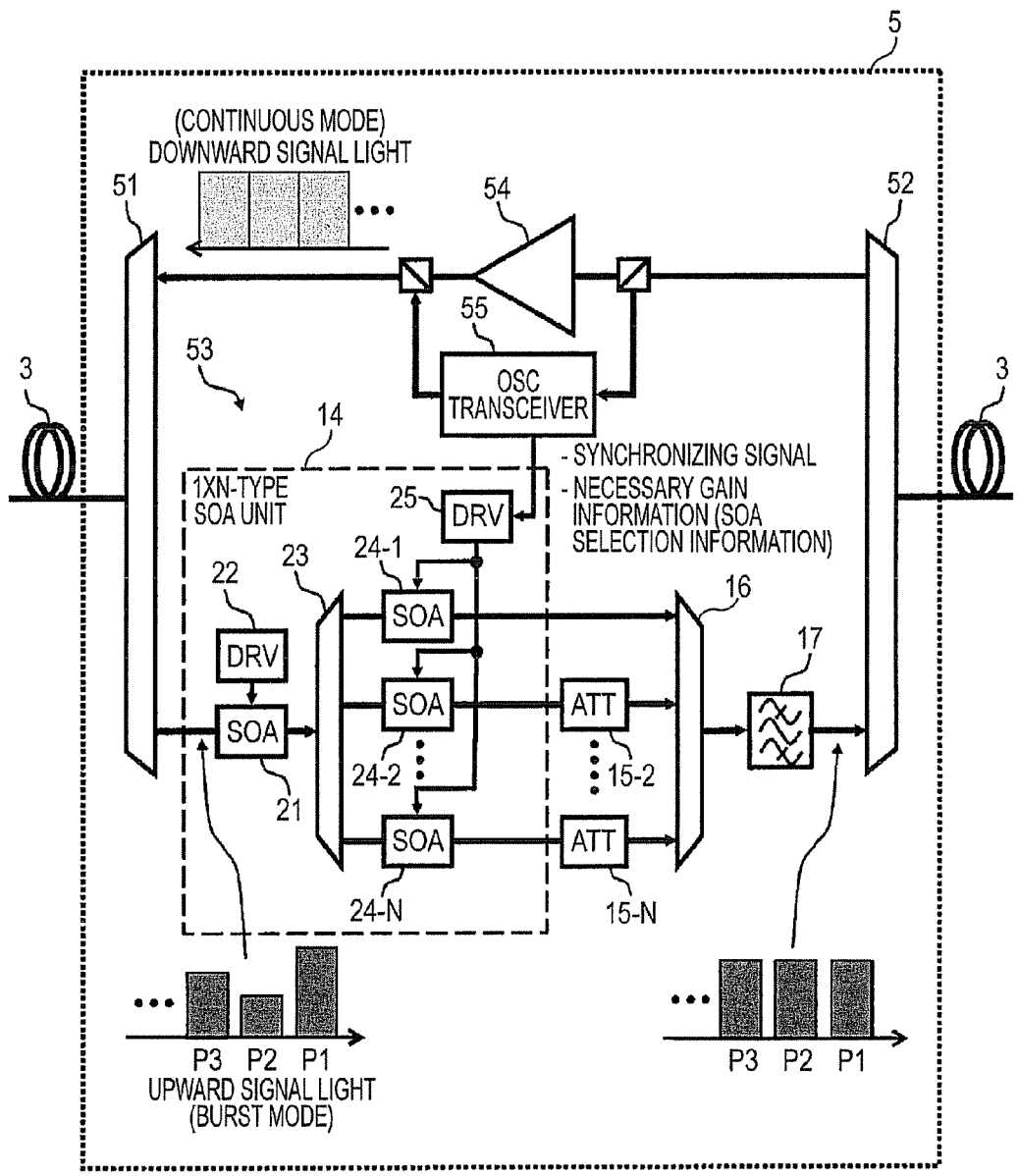
FIG. 6 is a diagram illustrating a configuration of the optical apparatus according to an embodiment.
Figure 7:
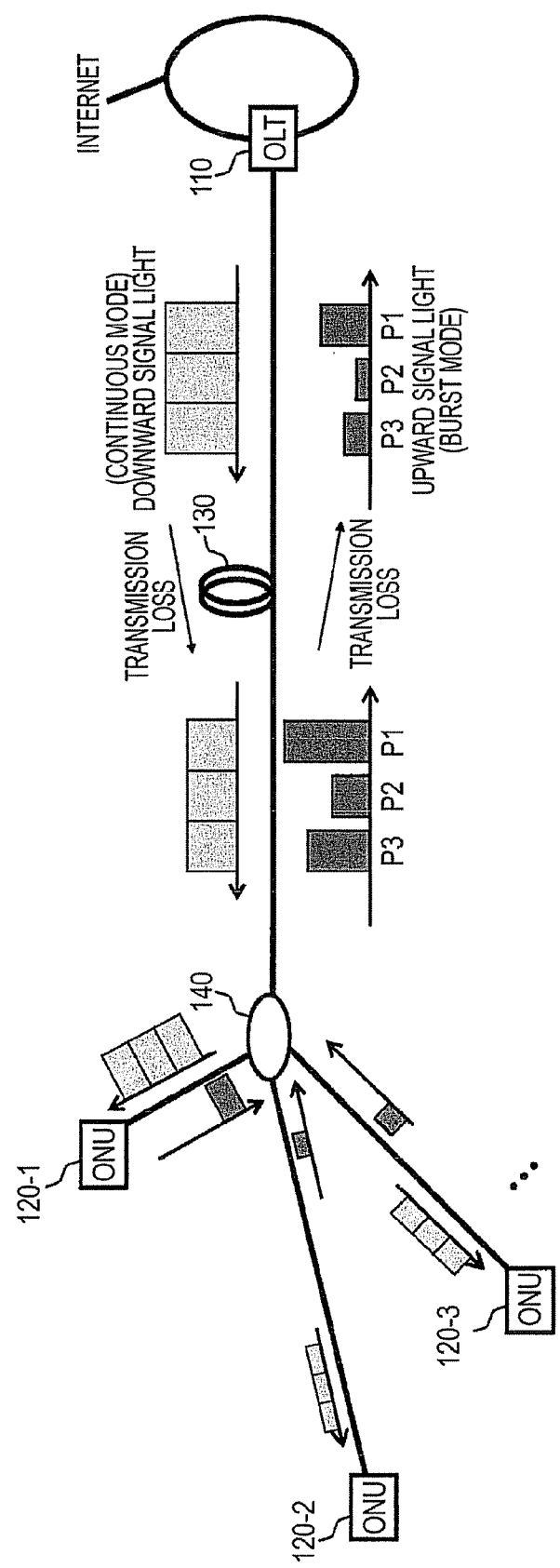
FIG. 7 is a diagram illustrating a configuration of a PON system.

FIG. 6 is a diagram illustrating a configuration of an embodiment in which an optical apparatus according to an embodiment is used as a relay apparatus in a PON system.

Figure 8:
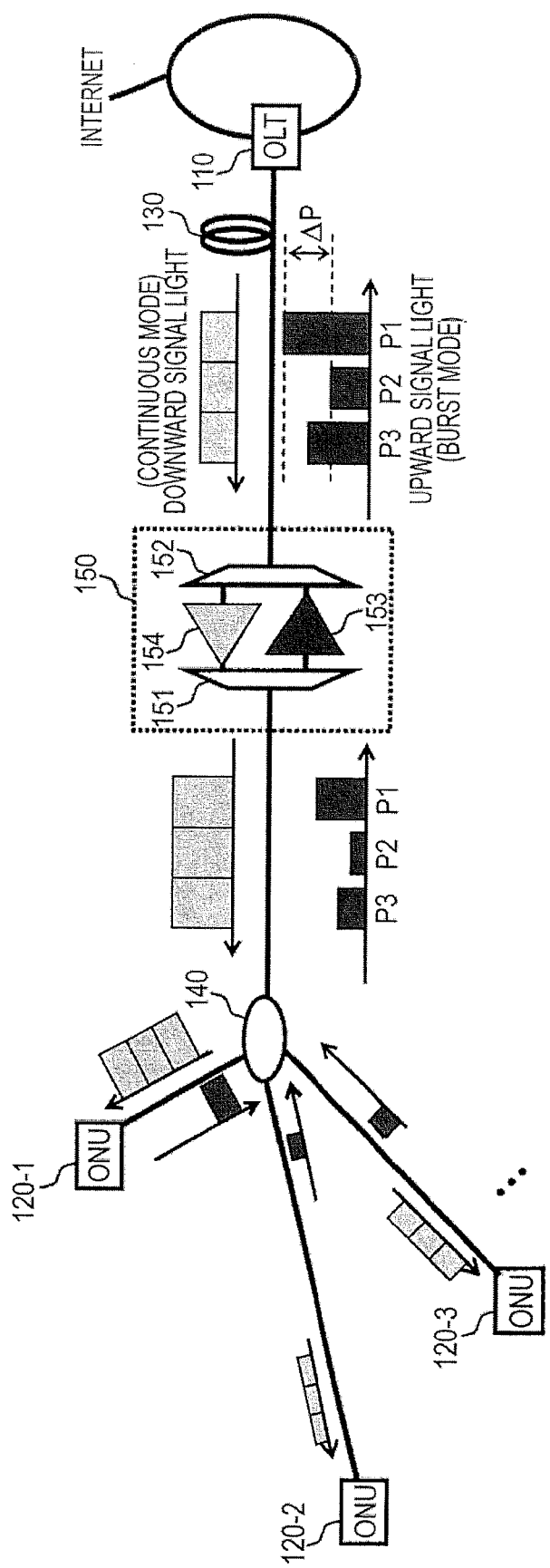
FIG. 8 is a diagram illustrating a configuration of a PON system in which a relay amplifier is disposed.
Figure 9:
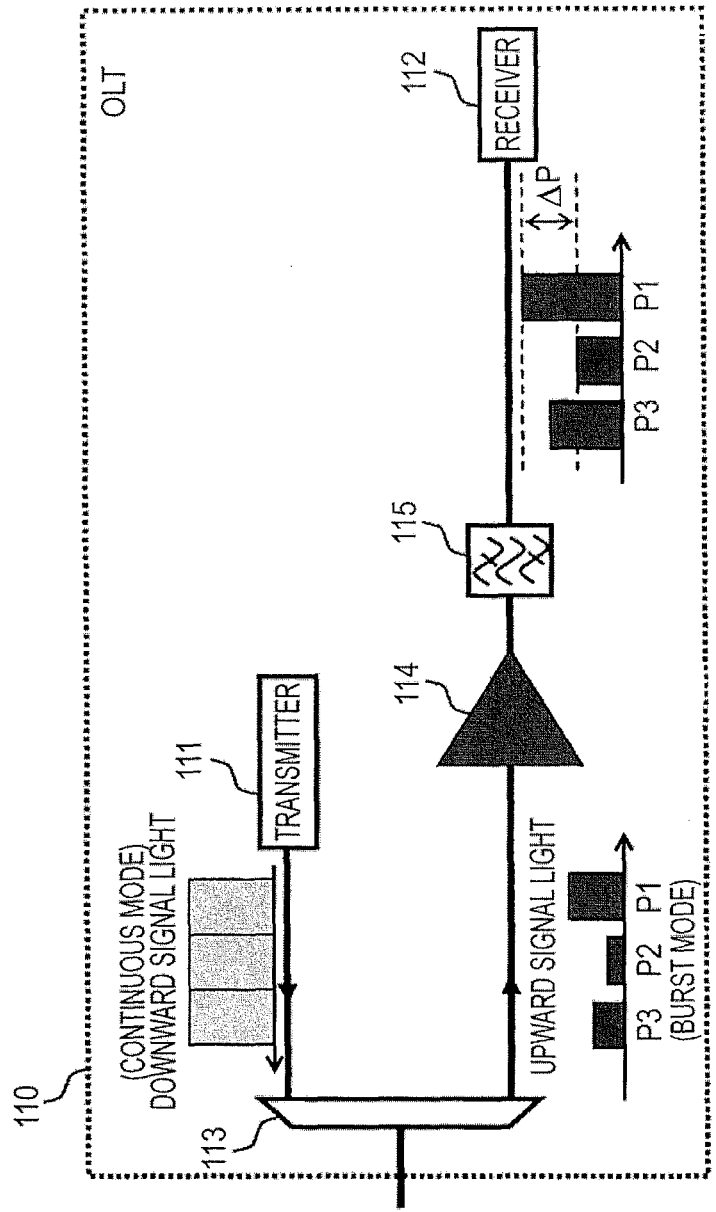
FIG. 9 is a diagram illustrating a configuration of an OLT in which a pre-amplifier for upward signal light is disposed.

In FIG. 6, a relay apparatus 5 corresponds to the relay amplifier 150 in the above-described PON system of the related art, which is illustrated in FIG. 8. In a configuration of an optical amplifier 53 that amplifies upward signal lights, the 1×N-type SOA unit 14, the ATTs 15-2 to 15-N, the multiplexer 16, and the optical filter 17, which are above described, are used. Herein, the synchronizing signal and required gain information that are supplied to the driver circuit 25 of the SOAs 24-1 to 24-N on the output side of the 1×N-type SOA unit 14 are transmitted from an OLT to the relay apparatus 5 by utilizing an optical supervisory channel (OSC), which is transmitted together with a downward signal light, thereby remotely controlling drive states of the SOAs 24-1 to 24-N on the output side of the 1×N-type SOA unit 14. More specifically, the OSC is received by an OSC transceiver 55, and the synchronizing signal and required gain information that are included in the OSC are output to the driver circuit 25. One of the SOAs 24-1 to 24-N on the output side of the 1×N-type SOA unit 14 is selectively driven using the synchronizing signal and the piece of required gain information.

Note that, WDM couplers 51 and 52 illustrated in FIG. 6 separate pieces of upward and downward signal light that are bidirectionally transmitted on the optical transmission line 3 from each other. Furthermore, an optical amplifier 54 is similar to an optical amplifier for amplifying a downward signal light of the related art.

Also in the relay apparatus 5 having the above-described configuration, as in the above-described case of the OLT 1 illustrated in FIG. 1, regarding the values of optical power P1, P2, P3, . . . corresponding to the respective time slots for the pieces of the upward signal light that passed the optical amplifier 53, the deviation ΔP that is caused by a variation in losses that occur between the respective ONUs 2-1, 2-2, 2-3, . . . , and 2-N and the optical coupler 4 (referring to FIG. 2) is compensated in accordance with gains that are set using the combination of the 1×N-type SOA unit 14 and the ATTs 15-2 to 15-N. Thus, even when the bit rate of upward signal light is equal to or higher than 10 Gbps, data that was transmitted from the respective ONUs 2-1, 2-2, 2-3, . . . , and 2-N can be reliably reproduced by the receiver that is provided in the OLT, regardless of a variation in losses that occur between the respective ONUs 2-1, 2-2, 2-3, . . . , and 2-N and the optical coupler 4.

Further, while specific type/number of units are illustrated herein, the present invention is not limited to any particular type or number of units. For example, any or part of the operation(s) discussed herein may be implemented via suitable hardware or software.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment(s) of the present inventions have been described in detail, it should be understood that the various changes, substitutions, and alterations could be made hereto without departing from the spirit and scope of the invention.

Further, although a few embodiments have been shown and described, it would be appreciated by those skilled in the art that changes may be made in these embodiments without departing from the principles and spirit of the invention, the scope of which is defined in the claims and their equivalents.

What is claimed is:

1. An optical apparatus, comprising:
   a splitter that receives a time-division-multiplexed signal light multiplexed from a plurality of transmitting devices;
   a plurality of semiconductor amplifiers coupled to the splitter, each of the semiconductor amplifiers corresponding to each of a plurality of time slots along a time axis of the signal light;
   a multiplexer coupled to the plurality of semiconductor amplifiers, the multiplexer being configured to output a branched time-division-multiplexed signal light amplified by the plurality of semiconductor amplifiers that each correspondingly input each of the signal lights branched from the splitter;

a receiver connected to the multiplexer; and a driving circuit connected to the plurality of semiconductor amplifiers, wherein the splitter is configured:
- to receive the signal light divided into the plurality of time slots, each of the plurality of time slots being respectively assigned to any one of the plurality of transmitting devices,
- to branch the signal light to a plurality of signal lights, and
- to input the plurality of signal lights to the plurality of semiconductor amplifiers one to one, the driving circuit configured:
- to supply, for each of the plurality of time slots, a driving current to one of the plurality of semiconductor amplifiers that corresponds to a time slot, each of the plurality of semiconductor amplifiers configured:
- to generate, when supplied with the driving current, an amplified branched signal light by amplifying one of the plurality of signal lights inputted with a constant gain, the constant gain being constant along a time axis and corresponding to one of the plurality of transmission devices, the constant gain being predetermined in accordance with the power dynamic range of the receiver and an optical transmission loss between the optical apparatus and the one of the plurality of transmission devices,
- to input the amplified branched signal light to the multiplexer when supplied with the driving current, and to input no branched signal light to the multiplexer when not supplied with the driving current, and the multiplexer configured to generate a composite signal light by composing each amplified signal, and to input the composite signal to the receiver.

2. The optical apparatus according to claim 1, wherein, each of the plurality of semiconductor amplifiers includes at least one of an optical amplifier and an optical attenuator, each optical amplifier has a same gain, and attenuation of each of the optical attenuator in the plurality of semiconductor amplifiers differs from one another.

3. The optical apparatus according to claim 2, wherein, the driving circuit is configured to supply the drive current to the optical amplifier in one of the plurality of semiconductor amplifiers corresponding to a required gain for the time slots of the signal light and do not supply drive current to other optical amplifiers.

4. The optical apparatus according to claim 1, wherein, each of the plurality of semiconductor amplifiers includes an optical amplifier with a gain that differs from one another.

5. The optical apparatus according to claim 4, wherein, the driving circuit is configured to supply the drive current to the optical amplifier in one of the plurality of semiconductor amplifiers corresponding to the required gain for the time slots of the signal light and do not supply drive current to other optical amplifiers.

6. The optical apparatus according to claim 1, wherein the semiconductor amplifiers include an input-side optical amplifier that amplifies the input signal light and outputs the input signal light to the branching unit.

7. The optical apparatus according to claim 1, wherein the semiconductor amplifiers include an optical filter that removes noise light included in an output light from the multiplexer.

8. A method of receiving a signal light from a plurality of transmitting devices, comprising:

receiving a time-division-multiplexed signal light multiplexed from a plurality of transmitting devices by a splitter;

determining a respective required gain for the signal light that is divided into a plurality of time slots and received from each of the plurality of transmitting devices;

branching the signal light to a plurality of signal lights;

inputting the plurality of signal lights to a plurality of semiconductor amplifiers one to one, supplying, for each of the plurality of time slots, a driving current to one of a plurality of semiconductor amplifiers that corresponds to a time slot, generating, when supplied with the driving current, an amplified signal light by amplifying one of the plurality of signal lights inputted with a constant gain, the constant gain being constant along a time axis and corresponding to one of the plurality of transmission devices, the constant gain being predetermined in accordance with the power dynamic range of the receiver and an optical transmission loss between the optical apparatus and the one of the plurality of transmission devices, inputting the amplified signal light to the multiplexer when supplied with the driving current, and to input no signal light to the multiplexer when not supplied with the driving current, and generating a composite signal light by composing each amplified signal, and to input the composite signal to the receiver.

9. A method of processing a signal light, comprising:

receiving, by a splitter, the signal light multiplexed from a plurality of transmitting devices;

determining each loss caused by branching of the signal light that is divided into a plurality of time slots and received from each of the plurality of transmitting devices;

branching the signal light to a plurality of signal lights by the splitter;

inputting the plurality of signal lights to a plurality of semiconductor amplifiers one to one;

supplying, for each of the plurality of time slots, a driving current to one of a plurality of semiconductor amplifiers that corresponds to a time slot;

generating, when supplied with the driving current, an amplified signal light by amplifying one of the plurality of signal lights inputted with a constant gain, the constant gain being constant along a time axis and corresponding to one of the plurality of transmission devices, the constant gain being predetermined in accordance with the power dynamic range of the receiver and an optical transmission loss between the optical apparatus and the one of the plurality of transmission devices;

inputting the amplified signal light to the multiplexer when supplied with the driving current, and to input no signal light to the multiplexer when not supplied with the driving current; and generating a composite signal light by composing each amplified signal, and to input the composite signal to the receiver.

10. The method according to claim 9, wherein said amplifying is implemented based on information of a table linking gain information and time slot information of the transmitting devices.

11. The optical apparatus according to the claim 1, wherein the splitter branches an upward signal light to a plurality of branched lights, and the multiplexer combines output lights from the plurality of semiconductor amplifiers.

12. The optical apparatus according to the claim 1, wherein gains vary depending on the plurality of the time slots and without depending on the wavelength of the plurality of signal lights.

13. The optical apparatus according to the claim 1, wherein the plurality of semiconductor amplifiers are configured to selectively amplify the plurality of signal lights having varied values of optical power corresponding to the plurality of time slots to compensate respective losses.

14. An optical apparatus, comprising:
a splitter that receives a time-division-multiplexed signal light multiplexed from a plurality of transmitting devices and branches branched-time-division-multiplexed signal lights;
a driving circuit configured to supply driving currents;
a plurality of semiconductor amplifiers connected with the splitter, at least two of the semiconductor amplifiers corresponding to signals of time slots included in the time-division-multiplexed signal light branched, each of the at least two semiconductor amplifiers exclusively amplifying the signals based on the driving currents supplied from the driving circuit in a time axis;
a multiplexer connected to the plurality of semiconductor amplifiers, the multiplexer being configured to output a branched time-division-multiplexed signal light amplified by the plurality of semiconductor amplifiers that each correspondingly input each of the signal lights branched from the splitter; and
a receiver connected to the multiplexer.

* * * * *

UNITED STATES PATENT AND TRADEMARK OFFICE
CERTIFICATE OF CORRECTION

| | | |
|---|---|---|
| PATENT NO. | : 8,977,131 B2 | Page 1 of 1 |
| APPLICATION NO. | : 12/372203 | |
| DATED | : March 10, 2015 | |
| INVENTOR(S) | : Setsuo Yoshida et al. | |

It is certified that error appears in the above-identified patent and that said Letters Patent is hereby corrected as shown below:

On the Title Page

Column 2, Item [56] (Other Publications), Line 2, delete "interferce" and insert -- interface --, therefor.

Signed and Sealed this
Eighteenth Day of August, 2015

Michelle K. Lee
*Director of the United States Patent and Trademark Office*